United States Patent [19]

Gooch et al.

[11] 4,419,139

[45] Dec. 6, 1983

[54] PROCESS FOR PREPARING COATING BINDERS FROM VEGETABLE OIL MATERIAL

[75] Inventors: Jan W. Gooch, Gladstone, Mo.; B. George Bufkin, Tipp City, Ohio; Gary C. Wildman, Hattiesburg, Miss.

[73] Assignee: University of Southern Mississippi, Hattiesburg, Miss.

[21] Appl. No.: 361,272

[22] Filed: Mar. 24, 1982

[51] Int. Cl.$^3$ .......................... C09D 3/28; C09D 3/64; C09D 3/72; C09D 5/02

[52] U.S. Cl. .......................... 106/252; 106/9; 523/207; 524/322; 524/591; 524/601; 524/904

[58] Field of Search .................... 106/252, 9; 523/207; 524/322, 601, 904, 591

[56] References Cited

U.S. PATENT DOCUMENTS

| | | | |
|---|---|---|---|
| 33,722 | 11/1861 | Walton | 106/252 |
| 334,019 | 1/1886 | Hoard et al. | 106/252 |
| 1,925,548 | 9/1933 | Willigen | 106/252 |
| 1,971,633 | 8/1934 | Baldwin | 106/252 |
| 1,971,634 | 8/1934 | Baldwin | 106/252 |
| 2,391,041 | 12/1945 | Stamberger | 106/252 |
| 2,418,453 | 4/1947 | Auer | 106/252 |
| 4,221,685 | 9/1980 | Eschwey et al. | 106/252 |
| 4,294,887 | 10/1981 | Nicks | 106/252 |

*Primary Examiner*—Ronald W. Griffin
*Attorney, Agent, or Firm*—Fitch, Even, Tabin & Flannery

[57] ABSTRACT

Vegetable oils or vegetable oil alkyds are emulsified in aqueous medium by means of a suitable emulsifying agent providing particles of oil or alkyd encapsulated in an oxygen permeable layer of emulsifying agent. The emulsified oil or alkyd particles are reduced to a predetermined size, and the emulsion is subjected to an oxygen-containing gas, preferably at elevated pressures, to effect autoxidation by cross-linking between olefin groups of unsaturated fatty acid moieties of the vegetable oils. Autoxidation is continued until the emulsified particles gel or nearly gel. When applied to a surface and exposed to air, the particles coalesce into a continuous film, and further oxidation and drying of the emulsion occurs.

15 Claims, No Drawings

PROCESS FOR PREPARING COATING BINDERS FROM VEGETABLE OIL MATERIAL

The present invention relates to coating binders and more particularly to polymeric coating binders prepared from vegetable oils.

BACKGROUND OF THE INVENTION

It is well known to use oils or fats, such as vegetable oils or fats, and alkyds derived therefrom, in solvent-borne coatings. Until the 1950's, alkyd resin coatings were the predominant binder in trade-sales and industrial paint sales. However, in recent times, use of solvent-borne coatings has substantially declined largely due to consumer preference for water-borne latex coatings which provide convenience in the form of easy clean-up, short dry times and low odor. Also contributing to the declining use of solvent-borne coatings is increasing recognition of environmental hazards posed by organic solvents.

Water-borne latex coatings, which have replaced solvent-borne coatings in many applications, are largely based on petroleum derived materials. Recent increases in costs of petroleum materials and the desirability of reducing importation of petroleum materials are well known and understood. It would therefore be desirable to provide coatings having the convenience of water-borne latex coatings but which are derived from vegetable oils, a renewable resource which may be obtained in abundance from agriculture production.

It is a general object of this invention to provide water-borne coating binders from vegetable oils or vegetable oil derived materials.

SUMMARY OF THE INVENTION

Coating binders are prepared from vegetable oils or vegetable oil alkyds which are formed by esterifying vegetable oils with organic acids and/or multi-functional alcohols. The oil or alkyd is mixed with a co-solvent and emulsified in an aqueous medium with an appropriate emulsifying agent, and the emulsion is treated to reduce the particles to below a predetermined average size. The emulsion is autoxidized by subjecting it to an oxygen-containing gas to cross-link unsaturated fatty acid moieties until the emulsified particles are gelled or nearly gelled.

DETAILED DESCRIPTION OF THE PREFERRED EMBODIMENT

In accordance with the present invention, a coating binder is prepared by autoxidizing a vegetable oil or vegetable oil alkyd emulsion. The oil or alkyd is introduced into water or an aqueous medium along with an appropriate emulsifying agent, and an emulsion is formed having an aqueous phase and particles with the oil or alkyd encapsulated in a oxygen permeable layer of the emulsifying agent. An oxygen-containing gas is contacted with the emulsion to autoxidize the emulsified particles by cross-linking the fatty acid moieties of the oil or alkyd. Upon sufficient cross-linking, the particles gel or nearly gel providing an emulsion suitable for use as a coating binder. When applied to a surface and exposed to air, the particles coalesce into a continuous film and further oxidation and cross-linking occurs.

Vegetable oils suitable for use in coatings according to the present invention are derived from a variety of plant sources including oiticica seed, safflower seed, cotton seed and in particular, tung, linseed and soya. The oils are largely comprised of triglycerides of both unsaturated fatty acids, such as oleic, linoleic, linolenic and licanic; and saturated fatty acids such as stearic, palmitic, myristic, lauric, capric and caprylic. The autoxidation of the emulsions acts to cross-link unsaturated fatty acids by forming ethoxy bonds between olefinic groups, and to achieve sufficient cross-linking, it is preferred that a vegetable oil or vegetable alkyd be used in which at least 60 atom percent of the fatty acid moieties are unsaturated.

It is preferred that the vegetable oils be converted to alkyds because alkyds of vegetable oils produce films of higher tensile strength than unmodified oils. Alkyds are prepared by esterifying vegetable oils with dibasic organic acids or anhydrides thereof and multi-functional alcohols. For example, alkyds may be prepared by esterifying vegetable oils with phthalic anhydride and multifunctional alcohols selected to provide a desired oil length. Alkyds having an oil length (oil percent by weight) of between about 25 and about 80, and preferably between about 40 and about 60, are suitable for forming water-borne alkyd coatings. It is found that urethane alkyds formed by esterifying vegetable oils with phthalic anhydride, polyol and a diisocyanate, form particularly desirable coating binders by the process of the invention.

In order to produce an emulsion, the vegetable oil or alkyd is introduced, along with an appropriate emulsifying agent, into water or an aqueous solution. Emulsions suitable for forming coatings comprise between about 40 and about 60 weight percent oil or oil-derived alkyd, and between about 0.5 and about 4 weight percent emulsifying agent. It is frequently necessary to mix the oil or alkyd with a hydrophobic co-solvent to achieve a stable emulsion, and the co-solvent is preferably present in amounts of between about 20 and about 35 weight percent of the oil or alkyd, i.e. between about 10 to about 17 weight percent of the emulsion. Greater amounts of co-solvent are considered undesirable because greater amounts result in coating binders with longer drying times and increased solvent release into the environment. Xylene has been found to be a particularly suitable co-solvent for stabilizing emulsions of the invention.

The emulsifying agent is selected with an appropriate hydrophilic-lipophilic balance for effecting a stabilized emulsion of the particular oil or alkyd. The emulsifying agent, which forms an outer particle layer that encapsulates the oil or alkyd and co-solvent, is selected for good oxygen permeability so that oxygen is efficiently transferred from the aqueous phase to the encapsulated hydrophobic material to effect autoxidation. Sodium dodecyl sulphate has been found to be a particularly suitable emulsifying agent for emulsifying oils. Mixtures of sodium dodecyl sulfate and alphatic alcohols, particularly those having ethyleneoxy adjuncts, have been found to be particularly suitable emulsifying agents for alkyds. Emulsifying agents for alkyds may comprise between about 25 and 100 weight percent aliphatic alcohols having appropriate hydrophilic-lipophilic balance with the remainder being sodium dodecyl sulphate or a similar detergent type surfactant. Suitable alcohols for emulsifying alkyds include but are not limited to nonylphenoxypoly (ethylenoxy)$_x$ ethanols, (x=2–20) such as those sold under tradename Igepal CO-430, 520, 530, 850; modified oxyethylated straight chain alcohols, such as those sold under the tradenames Plurafac RS- 20, 25, 26, 30 and 40; and alkyl-aryl polyether alcohols such as those sold under the tradenames Triton X-207 and 363M.

It is found that it is necessary for the aqueous phase of the emulsion to be acidic to promote autoxidation. Accordingly, the aqueous phase is adjusted to a pH of between about 2.5 and about 6.0.

Generally, the emulsifying agent is added to the water prior to addition of the oil. After the oil or alkyd is added, emulsification is effected by conventional means, e.g., rapid mixing, sonification, etc. A pre-emulsion, initially formed, generally contains particles larger than is consistent with emulsion stability and good film characteristics, and the emulsion is stabilized by homogenization, e.g., by extrusion at high pressure, reducing the average size of the emulsified particles to below a predetermined size. Preferably the homogenization reduces the size of the particles to less than one micron in diameter. The emulsion of finely divided particles is stable for several days.

Small particle size is important not only for emulsion stability, but is an important consideration for coalescence and film formation of the oxidized emulsion. The forces exerted on the emulsion particles during drying are those arising from the water-air and polymer-water interfacial tensions that bring the particles into close contact and initiate coalescence. The maximum shear modulus decreases inversely with increasing particle size, e.g., the maximum shear modulus for coalescence for a particle diameter of 1.0 micron is calculated to be 11.2 kg/cm$^2$ and the maximum shear modulus for coalescence for a particle diameter of 10.0 microns is calculated to be 1.1 kg/cm$^2$. If the shear modulus of the polymer is too high, particle coalescence will be incomplete and the film properties will be diminished. Thus, the larger the particle size in the dispersion, the softer the polymer must be in order for the particles to coalesce upon drying. If the shear modulus of the polymer is too high, particle coaslecence will be incomplete and the film properties will be diminished. However, polymers sufficiently soft to coaslesce large particles will also form films of diminished properties.

Cross-linking of fatty acids within the emulsified particles is effected by exposing the emulsion to an oxygen-carrying gas. Historically, two fundamental theories of autoxidation are dominant. First, there is the allylic abstraction of a hydrogen atom and second, direct addition of oxygen to the double bond. One of the most important consequences of this free radical theory of olefin autoxidation is that the unpaired electron in the initially formed allylic type hydrocarbon radical is delocalized, being more or less equally distributed between the "1" and "3" carbon atoms in the alkylated ethylenes. This leads to two consequences. The first is that more than one hydroperoxide may be formed, the ratios of the various hydroperoxides depending on the electron densities on the carbon atoms involved. The second is that the greater the rate of formation of hydroperoxide, the more delocalized an unpaired electron is. The investigations of Farmer, *Paint and Varnish Technology*, Reinhold Publishing Co., New York (1968) p. 31, on polyenes showed the existence of both of these phenomena.

Autoxidative cross-linking of the above materials results in the formation of three-dimensional polymers containing carbon-carbon and ether linkages. The degree of cross-linking is controlled by factors which enhance autoxidation including oxygen concentration, concentration of unsaturated and conjugated groups and temperature.

Air may be used for autoxidizing the emulsion; however, it is found that oxidizing with air may result in significant amounts of trapped gas in the emulsion and gas voids in the resulting films. Such gas inclusions reduce the strength of the film, and accordingly, it is preferred that substantially pure oxygen be used to effect oxidation. Although autoxidation will occur at atmospheric pressure, the rate of autoxidation at atmospheric pressure proceeds slowly. To achieve an efficient rate of oxidation, the emulsion is generally subjected to oxygen or oxygen-carrying gas at pressures of between 2 and about 10 atmospheres.

The stabilized emulsion is autoxidized under conditions which tend to maximize contact of the gas with the emulsion and thereby promote rapid autoxidation without destabilizing the emulsion. The stabilized emulsion is introduced into a pressure vessel in which mechanical stirring is provided, e.g., with a paddle type stirrer. Oxygen or oxygen-containing gas is bubbled through the emulsion, preferably at a rate of between about 20 and about 800 cm$^3$/min. per liter of emulsion. Agitation in addition to that provided by the bubbling gas, is provided by mechanical stirring; however, care is taken so that agitation is not so vigorous that the emulsion is destabilized. The autoxidation is preferably carried out at temperatures above about 40° C. to provide an adequate reaction rate and below and about 80° C., above which temperature the emulsion destabilizes.

Autoxidation of oil and alkyds is exothermic, and in its early stages, the reaction generates sufficient heat to bring the emulsion to a desired reaction temperature. During this stage, the temperature within the vessel may be controlled by the rate of introduction of oxygen. In later stages, external heat is supplied to the reaction vessel. Oxidation is continued until the emulsified particles gel or are close to gelling. Substantial autoxidation beyond the point of gelling results in destabilization of the emulsion and particle precipitation.

As the oxidizing gas stream is bubbled through the emulsion, oxidation of the emulsified oils or alkyds occurs cross-linking the fatty acid moieties of the particles making the particles harder and denser. As a secondary consequence of bubbling the gas through the emulsion, water and co-solvent are vaporized and the oil or alkyd concentration of the emulsion increases with time. Due to evaporation of solvent and cross-linking, the particle size decreases slightly. Turbulence created by the agitator in the chamber tends to break the larger emulsified particles also contributing to reduction in average particle size.

As the autoxidation reaction proceeds, the relative viscosity decreases slightly initially and then increases steadily while the absolute viscosity steadily decreases. The relative viscosity is obtained by effluxing the emulsion through a capillary viscometer and obtaining a ratio of its efflux time to that of distilled water or the aqueous phase of the emulsion. The increase in relative viscosity can be attributed to percent change in nonvolatile material, a percentage which typically increases by about eight percent during the reaction. The absolute viscosity is a measurement of resistance to rotation of a cylindrical spindle within the emulsion. As cross-linking increases within the particles, the particles become hard "spheres" in the aqueous phase. The decrease in centipoise (absolute viscosity) with reaction time is a result of the hardening of the spheres, an effect which overrides the percent change in solids with reaction time.

Changes in viscosity provide one means of monitoring the autoxidation reaction; however, a preferred method of monitoring the progression of the autoxidation reaction is by measuring the swelling characteristics of the cross-linked particles. If a cross-linked polymer is added to a solvent of the uncross-linked polymer than the cross-linked polymer will swell increasing in volume, but it will not dissolve. Swelling of the cross-linked material continues in three dimensions until the osmotic forces of the solution are balanced by the forces of polymer chain stretching, which elastic retractive forces are inversely proportional to the molecular weight of the polymer between cross-links. A highly cross-linked polymer will, therefore, not swell as much as a lightly cross-linked polymer, and a measurement of the degree of cross-linking is obtainable by comparing the volume of the solvent-swollen polymer to the volume of the dry polymer. As autoxidation and cross-linking proceed, the swelling ratio decreases, and a swelling ratio between about 10 and about 3 is indicative of a gelled or nearly gelled state of the emulsified particles and an end point of autoxidation at which the emulsion has flow characteristics suitable for a coating binder. The reaction is stopped before excess autoxidation leading to precipitation of the emulsified particles occurs. At the end point of the autoxidation, the emulsion has excellent water clean-up characteristics, and a paint brush used to apply such a coating binder may be completely cleaned with soap and water.

A further method of monitoring the autoxidation reaction is by measuring the solubility of the emulsion in acetone. With increasing cross-linking, the solubility of the particles in acetone decreases, and percent light transmittance of an emulsion-acetone mixture decreases. A sharp light transmittance drop of the emulsion-acetone mixture occurs towards the end point of the autoxidation reaction.

After the autoxidation is completed, the pH, which has decreased during the reaction, may be adjusted toward neutrality. The coating binder emulsion is stabilized at pH's below 7.0; however, the tensile strength of the resulting film is found to improve if the pH of the emulsion is adjusted to near 7.0.

Cobalt has been found to have a stabilizing effect on the binder emulsions, and it is preferred to stabilize the binder with up to about 0.05 weight percent of a cobalt-containing compound such as cobalt naphthenate.

When the coating binders are applied to a surface, they dry and coalesce into continuous films. Coating binders produced by the method of the invention may be formulated to surface dry, i.e., become non-tacky, in less than 0.5 hours. Thereafter final setting and drying occurs during which process some additional cross-linking occurs in the air-exposed film. Electron microscope examination of the films formed from the coatings show outlines of the original emulsified particles, but the individual particles can be seen to be coalescing with each other to form the continuous film. If the particles are excessively oxidized, they do not coalesce, an effect which is observable by electron microscopy. Insufficiently cross-linked particles coalesce; however, the resultant film requires an excessive drying time. Thus, control of the autoxidative cross-linking reaction is imperative to good film integrity and reasonable drying time.

The invention will now be described in greater detail by way of specific examples.

EXAMPLE I

A soya oil coating was prepared from a mixture having the initial formulation of 500 g alkali (refined soya oil, 490 g distilled water, and 10 g sodium dodecyl sulphate as the emulsifying agent.

The dodecyl sodium sulfate was first dissolved in the water at 25° C. The oil was then dispersed with a Braunsonic vibrator to form a pre-emulsion. The pre-emulsion was transferred to a Gaulin sub-micron disperser and homogenizer, and the emulsion was recycled through the homogenizer operating at 3500 psi shear force until the average particle size was reduced to about 0.9 microns in diameter as determined with a Coulter-Counter.

The emulsion was charged into a reaction vessel under atmospheric pressure, 99.9% pure oxygen gas was bubbled through the emulsion at a rate of 708 $cm^3$ per minute, and the emulsion was agitated with a paddle type stirrer at 60 revolutions per minute. The temperature of the emulsion was maintained at 55° C. for 48 hours. During this time the intrinsic viscosity of the oil increased from 0.096 to 0.460 as determined with a Cannon-Fenske viscometer indicating the occurrence of polymerization as described in Collins et al., *Experiments in Polymer Science,* John Wiley and Sons, New York (1973) pp. 149–152, 394–447.

The polymerized emulsion was applied to a steel substrate whereon it coalesced into a continuous film.

EXAMPLE II

Alkyds were prepared from the following formulations:

I. Short oil soya alkyd; 50% soya oil, 28% polyol, 42% phthalic anhydride.

II. Medium oil soya alkyd, 52% soya oil, 18% polyol, 35% phthalic anhydride.

III. Long oil soya alkyd; 60% soya oil, 8% polyol, 23% phthalic anhydride.

IV. Urethane soya alkyd; 62% soya oil, 11% polyol, 9% phthalic anhydride, 18% toluene diisocyanate.

The soya oil alkyds were prepared by charging soya oil and the phthalic anhydride into a 200 ml. four-neck resin kettle equipped with a mechanical stirrer, nitrogen inlet, 0°–250° C. thermometer and a steam jacketed, barret trap, water cooled condenser assembly. Xylene was added as solvent and the temperature was raised to 100° C., at which time the polyol was added. Upon continued heating, esterfication proceeded and evolution of water occured at about 160° C. The reaction temperature was held below 180° C. and the reaction was allowed to proceed until the appropriate acid value was reached, i.e., alkyd I, 12; alkyd II, 10; alkyd III, 12; alkyd IV, 10.

Emulsions having the following formulations were prepared. Akyld I-IV, 50 weight percent; distilled water, 48.0 weight percent; and emulsifier (75% nonylphenoxypoly(etheneoxy)$_4$ alcohol, 25% dodecyl sodium sulfate), 2.0 weight percent.

The emulsifying agent was first dissolved in the water at 25° C. The alkyd was then mixed with the emulsifier solution while dispersed with a Braunsonic Ultrasonic vibrator to form a pre-emulsion. The pre-emulsion was transferred to a Gaulin sub-micron disperser and homogenizer, and the emulsion was recycled through the homogenizer operating at 3500 psi shear force until the average particle size was reduced to about 0.9 microns in diameter as determined by a Coulter-Counter.

Emulsions of alkyds I-IV were charged into a Bench Scale pressure vessel. The temperature was brought up to and maintained at 55° C. 99.9% pure oxygen was bubbled through the emulsion at a flow rate of 708 cm$^3$ per minute per liter of emulsion and an oxygen pressure of 80 psig was maintained. Periodically, samples were extracted from the pressure vessel for determination of the swelling ratio as described above. When the swelling ratio dropped below 10.0, the reaction was terminated.

The coatings, thus prepared, were applied to the surface of a steel substrate. Dry time (to non-tackiness) was measured as well as tensile strength of the fully dried film. Commercial emulsions, Rhoplex AC-64 (V) and Amsco 3077 (VI), were also tested for comparison of tensile strength and dry time. The results are set forth in Table I below.

TABLE I

| Alkyd | Percent oil | Tensile Strength (kg/cm$^2$) | Dry time (hours) |
|---|---|---|---|
| I | 30 | 5.2 | 1.0 |
| II | 52 | 10.7 | 0.5 |
| III | 60 | 3.6 | 1.1 |
| IV | 62 | 21.5 | 1.0 |
| V | — | 35.5 | 0.5 |
| VI | — | 24.6 | 0.5 |

The above results show that coatings with good dry times and adequate tensile strength may be prepared according to the methods of the invention. The tensile strength of formulation (IV), the urethane formulation, compared quite favorably with the tensile strength of the commercial formulations (V and VI).

While the invention has been described in terms of certain preferred embodiments, modifications obvious to one with ordinary skill in the art may be made without departing from the scope of the invention. For example, mixtures of vegetable oils, vegetable oil-derived alkyds and oils and alkyds may be used in many cases rather than an oil or alkyd derived from a single vegetable source.

Various features of the invention are set forth in the following claims.

What is claimed is:

1. A process of preparing a coating binder from a vegetable oil alkyd comprising
   introducing an alkyd of which about 60% of its fatty acid moieties are unsaturated and an oxygen permeable emulsifying agent into an aqueous medium,
   emulsifying said alkyd in said aqueous medium to encapsulate said alkyd in particles having an oxygen permeable outer layer of said emulsifying agent,
   subjecting said particles to shear force to adjust the average particle size to below about 1 micron in diameter,
   adjusting the pH of said emulsion to between about 2.5 and about 6.0, and
   contacting said emulsion with an oxygen-containing gas at pressures of between about 1 atmosphere and about 10 atmospheres to effect autoxidation of said alkyd sufficient to cross-link said alkyd until the swelling ratio of said emulsified particles is between about 10 and about 3, gelling or nearly gelling said particles.

2. A process in accordance with claim 1 wherein said emulsion is autoxidized at temperatures of between about 40° and about 80° C.

3. A process in accordance with claim 1 wherein said alkyd is derived from the group of oils consisting of soya oil, linseed oil, tung oil, oiticica seed oil, safflower oil, cottonseed oil, and mixtures thereof.

4. A process in accordance with claim 1 wherein said alkyds are prepared by esterifying vegetable oils with phthalic acid and multifunctional alcohols.

5. A process in accordance with claim 1 wherein said alkyds are vegetable oil-based urethane alkyds.

6. A process in accordance with claim 1 wherein said autoxidation is effected with substantially pure oxygen.

7. A process according to claim 1 wherein said alkyd is mixed with a hydrophobic co-solvent and said mixture is introduced to said emulsifying agent,
   said alkyd comprising between about 30 and about 50 weight percent of said emulsion, said co-solvent comprising between about 10 and about 17 weight percent of said emulsion, water comprising between about 50 and about 60 weight percent of said emulsion and said emulsifying agent comprising between about 0.05 and about 4 weight percent of said emulsion.

8. A process according to claim 7 wherein said co-solvent is xylene.

9. A process according to claim 1 wherein said emulsifying agent comprises between about 25 and 100 weight percent alphatic alcohols and the remainder of said emulsifying agent comprising a detergent type surfactant.

10. A process of preparing a coating binder from a vegetable oil comprising
    introducing an oil, wherein above about 60% of the fatty acid moieties of said oil are unsaturated, and an oxygen permeable emulsifying agent into an aqueous medium,
    emulsifying said oil in said aqueous medium to encapsulate said oil in particles having an oxygen permeable outer layer of said emulsifying agent,
    subjecting said particles to shear force to adjust the average particle size to below about 1 micron in diameter,
    adjusting the pH of said emulsion to between about 2.5 and about 6.0, and
    contacting said emulsion with an oxygen-containing gas at pressures between about 1 atmosphere and about 10 atmospheres to effect autoxidation of said oil sufficient to cross-link said oil until the swelling ratio of said emulsified particles is between about 10 and about 3, gelling or nearly gelling said particles.

11. A process in accordance with claim 10 wherein said oil is selected from the group consisting of soya oil, linseed oil, tung oil, oiticica seed oil, safflower oil, cottonseed oil, and mixtures thereof.

12. A process in accordance with claim 10 wherein said autoxidation is effected with substantially pure oxygen.

13. A process according to claim 10 wherein said oil is mixed with hydrophobic co-solvent and said mixture is introduced to said emulsifying agent,
    said oil comprising between about 30 and about 50 weight percent of said emulsion, said co-solvent comprising between about 10 and about 17 weight percent of said emulsion, water comprising between about 50 and about 60 weight percent of said emulsion and said emulsifying agent comprising between about 0.05 and about 4 weight percent of said emulsion.

14. A process according to claim 13 wherein said co-solvent is xylene.

15. A process in accordance with claim 10 wherein said emulsion is autoxidized at temperatures of between about 40° and about 80° C.

* * * * *